US012811324B2

(12) United States Patent
Jung

(10) Patent No.: US 12,811,324 B2
(45) Date of Patent: Nov. 24, 2026

(54) CONNECTOR WITH RELIABLE CABLE CONNECTION

(71) Applicant: SAMSUNG ELECTRONICS CO., LTD., Suwon-si (KR)

(72) Inventor: Seungwoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 341 days.

(21) Appl. No.: 18/382,351

(22) Filed: Oct. 20, 2023

(65) Prior Publication Data

US 2024/0145963 A1 May 2, 2024

Related U.S. Application Data

(63) Continuation of application No. PCT/KR2023/014226, filed on Sep. 20, 2023.

(30) Foreign Application Priority Data

Oct. 26, 2022 (KR) ........................ 10-2022-0139488

(51) Int. Cl.
*H01R 12/79* (2011.01)
*H01R 12/72* (2011.01)
(Continued)

(52) U.S. Cl.
CPC ........... *H01R 12/79* (2013.01); *H01R 12/722* (2013.01); *H01R 12/774* (2013.01); *H01R 13/641* (2013.01)

(58) Field of Classification Search
CPC .... H01R 12/79; H01R 13/629; H01R 13/639; H01R 12/722; H01R 12/774; H01R 12/87; H01R 13/641; H01R 13/62933
(Continued)

(56) References Cited

U.S. PATENT DOCUMENTS

| | | | | |
|---|---|---|---|---|
| 6,042,410 | A * | 3/2000 | Watanabe ............ | H01R 13/193 439/260 |
| 7,128,597 | B2 | 10/2006 | Niitsu et al. | |
| 9,225,097 | B2 | 12/2015 | Yokoo | |
| 2005/0170671 | A1* | 8/2005 | Niitsu .................... | H01R 12/79 439/38 |

(Continued)

FOREIGN PATENT DOCUMENTS

| | | | |
|---|---|---|---|
| JP | 5-17764 | U | 3/1993 |
| JP | 07-45796 | Y2 | 10/1995 |

(Continued)

OTHER PUBLICATIONS

International Search Report (PCT/ISA/210) issued Jan. 10, 2024 by the International Searching Authority in International Patent Application No. PCT/KR2023/014226.

(Continued)

*Primary Examiner* — Abdullah A Riyami
*Assistant Examiner* — Amara Anderson
(74) *Attorney, Agent, or Firm* — Sughrue Mion, PLLC

(57) ABSTRACT

A connector to which a cable provided with a plurality of first terminals is connected is provided. The connector may include a base; a locking member rotatably connected to the base; a first operating member and a second operating member, spaced from the first operating member, each with respective ones of first ends fixed to the base and second ends fixed to the locking member. And first operating member and the second operating member may be configured to, based on being pressed by a front end of the cable, rotate the locking member from an open position to a closed position and to lock the front end of the cable between the base and the locking member.

20 Claims, 13 Drawing Sheets

(51) Int. Cl.
*H01R 12/77* (2011.01)
*H01R 13/641* (2006.01)

(58) Field of Classification Search
USPC .......................................................... 439/38
See application file for complete search history.

(56) References Cited

U.S. PATENT DOCUMENTS

| | | | |
|---|---|---|---|
| 2007/0004266 A1 | 1/2007 | Tang et al. |
| 2011/0081791 A1 | 4/2011 | Kim |
| 2015/0024617 A1 | 1/2015 | Yokoo |
| 2020/0328560 A1 | 10/2020 | Gan |

FOREIGN PATENT DOCUMENTS

| | | | |
|---|---|---|---|
| JP | H0745796 Y2 * | 10/1995 |
| JP | H10-302909 A | 11/1998 |
| JP | 2003-297465 A | 10/2003 |
| JP | 2009-295323 A | 12/2009 |
| JP | 5157651 B2 | 3/2013 |
| JP | 6181991 B2 | 8/2017 |
| KR | 10-0996095 B1 | 11/2010 |
| KR | 10-2015-0009918 A | 1/2015 |
| KR | 10-2057451 B1 | 12/2019 |

OTHER PUBLICATIONS

Written Opinion (PCT/ISA/237) issued Jan. 10, 2024 by the International Searching Authority in International Patent Application No. PCT/KR2023/014226.
Communication issued Sep. 19, 2025 by the European Patent Office in European Patent Application No. 23882902.2.
Communication issued Sep. 20, 2026 by the Korean Intellectual Property Office in Korean Patent Application No. 10-2022-0139488.

* cited by examiner

CONNECTOR WITH RELIABLE CABLE CONNECTION

CROSS REFERENCE TO RELATED APPLICATIONS

The present application is a continuation of International Application No. PCT/KR2023/014226, filed on Sep. 20, 2023, which claims priority to Korean Patent Application No. 10-2022-0139488, filed on Oct. 26, 2022, in Korean Intellectual Property Office, the contents of which are hereby incorporated by reference herein in their entireties.

BACKGROUND

1. Field

The disclosure relates to a connector to which a cable may be connected in a reliable posture.

2. Description of the Related Art

Inside of an electronic device (e.g., a television), a flat flexible cables (FFC) is used for signal communication between printed circuit boards (e.g., image boards). The FFC is connected to a connector mounted on a printed circuit board (PCB) by a worker. The connector is provided with a top locking structure to prevent the connected FFC from being disconnected from the connector or to prevent connection from being loosened.

However, as for the FFC, unlike a cable of a harness type, even if the FFC is not accurately coupled to the connector, a top locking structure of the connector may operate and be closed. In this case, the FFC is electrically connected to the connector in an unstable manner. When an electronic device is assembled in this unstable state, there may be a problem that the number of defective products and the number of re-work due to a cable connection failure may increase.

SUMMARY

Provided is a connector to which a cable may be connected in an efficient posture.

According to one or more embodiments, a connector connected to a cable including a plurality of first terminals, includes: a base including a plurality of second terminals; a locking member including a plurality of third terminals and an end rotatably connected to the base; a first operating member including a first end of the first operating member and a second end of the first operating member, the first end of the first operating member is fixed to the base, and the second end of the first operating member is fixed to the locking member, and a second operating member spaced apart from the first operating member and including a first end fixed to the base and a second end fixed to the locking member, wherein the first operating member and the second operating member are configured to, based on being pressed by a front end of the cable, rotate the locking member from an open position to a closed position and to lock the front end of the cable between the base and the locking member.

The first operating member may be disposed at a first side of the base and the locking member, the second operating member may be disposed a second side of the base and the locking member, and the first operating member and the second operating member are further configured to, based on being pressed by the front end of the cable, pull the locking member toward the base by tension.

The first operating member and the second operating member may include a flexible material.

The first operating member and the second operating member may be further configured to, based on the locking member being in a closed position, be disposed in a position not electrically connected to the plurality of second terminals and the plurality of third terminals.

The first operating member and the second operating member may be non-conductive.

The first operating member may be further configured to, based on the locking member being in a closed position, be disposed in a position electrically connected to at least one of a first one of the plurality of second terminals or a first one of the plurality of third terminals, and the second operating member may be further configured to, based on the locking member being in the closed position, be disposed in a position electrically connected to at least one of a second one of the plurality of second terminals or a second one of the plurality of third terminals.

The first operating member and the second operating member may be conductive.

The connector may further include at least one third operating member disposed between the first operating member and the second operating member, and the at least one third operating member may include a first end fixed to the base and a second end fixed to the locking member.

The first operating member and the second operating member may be configured to, based on the locking member being in a closed position, be inserted into the base and the locking member.

The base may further include a first receiving groove into which a first portion of the first operating member is inserted and a second receiving groove into which a first portion of the second operating member is inserted, and the locking member may further include a third receiving groove into which a second portion of the first operating member is inserted and a fourth receiving groove into which a second portion of the second operating member is inserted.

The first operating member may be further configured to, based on the locking member being in a closed position, be disposed in a positon not electrically connected with the plurality of second terminals and the plurality of third terminals, and the second operating member may be further configured to, based on the locking member being in a closed position, be disposed in a position electrically connected with one of the plurality of second terminals and one of the plurality of third terminals.

The first operating member may be non-conductive, and the second operating member may be conductive.

The first operating member and the second operating member may have a string shape.

The first operating member and the second operating member may have a strap shape.

A first one of the base and the locking member may include a magnet, and a second one of the base and the locking member may include a magnetic body configured to, when the locking member is closed, be disposed at a position corresponding to the magnet.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION

Examples embodiments described hereinafter are provided for easy understanding of the disclosure, and it should be understood that various changes may be made to examples described herein and the disclosure may be embodied in different forms. In addition, in the following description, detailed descriptions of well-known functions or configurations will be omitted since such descriptions would unnecessarily obscure the subject matters of the disclosure. In addition, the drawings are provided for easy understanding of the disclosure and are not illustrated to scale, and, as such, dimensions of some elements may be exaggerated.

It will be understood that, although the terms first, second, etc. may be used to describe various elements, the elements should not be limited by the terms. The terms can be used only for the purpose of distinguishing one component from another component. For example, a first element could be termed a second element, and, similarly, a second element could be termed a first element, without departing from the scope of the disclosure.

Unless otherwise defined, the terms used in the embodiments of the disclosure may be interpreted to have the same meaning as commonly known to one of ordinary skill in the art.

The terms "front end", "rear end", "upper part", "lower part", "upper end", and "lower end" used in the disclosure are defined based on the drawings, and the shape and position of each component are not limited by the terms.

In the disclosure, "the same" may refer to components that are matched as well as those that may be different within an extent of a processing or manufacturing error range.

It is understood that various elements and regions in the figures may be shown out of scale. Accordingly, the scope of the disclosure is not limited by the relative sizes or spacing drawn from the accompanying drawings, unless otherwise stated. When it was decided that a detailed description for the known art related to the disclosure may unnecessarily obscure the gist of the disclosure, the detailed description was shortened or omitted.

Hereinafter, with reference to the attached drawings, a connector structure according to one or more embodiments of the disclosure will be described in detail so that those skilled in the art, to which the disclosure belongs, can easily make and use the embodiments.

Figure 1:
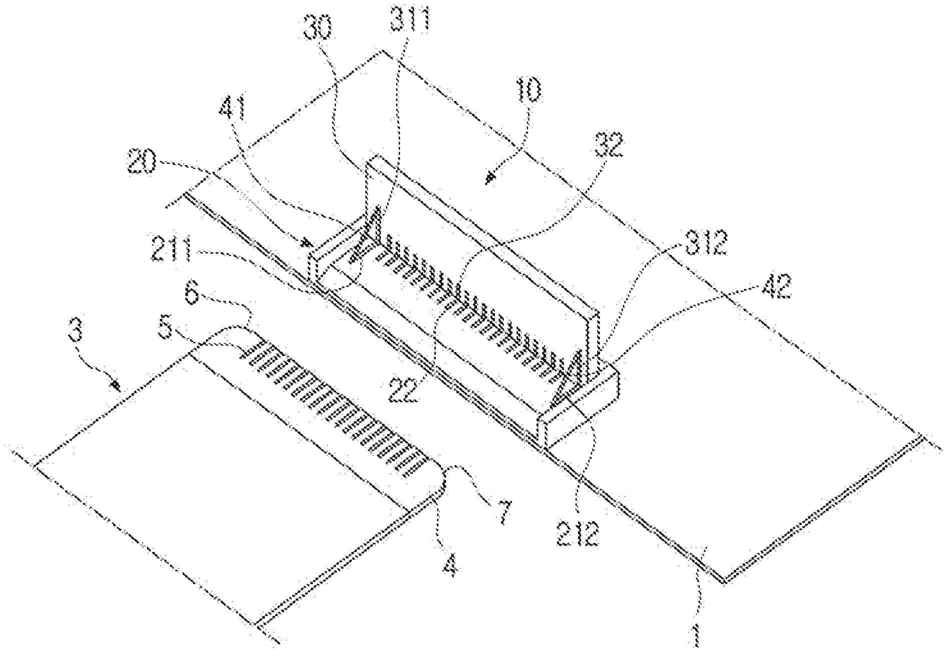
FIG. 1 is a perspective view illustrating a connector according to one or more embodiments of the disclosure.
Figure 2:
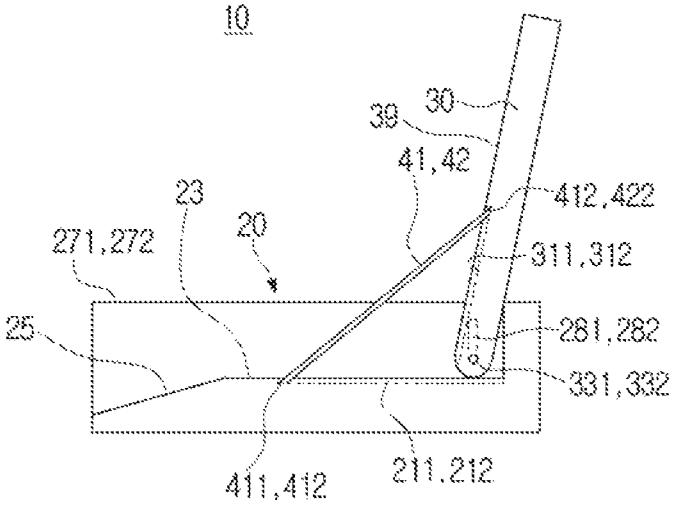
FIG. 2 is a side view illustrating a connector according to one or more embodiments of the disclosure.
Figure 3A:
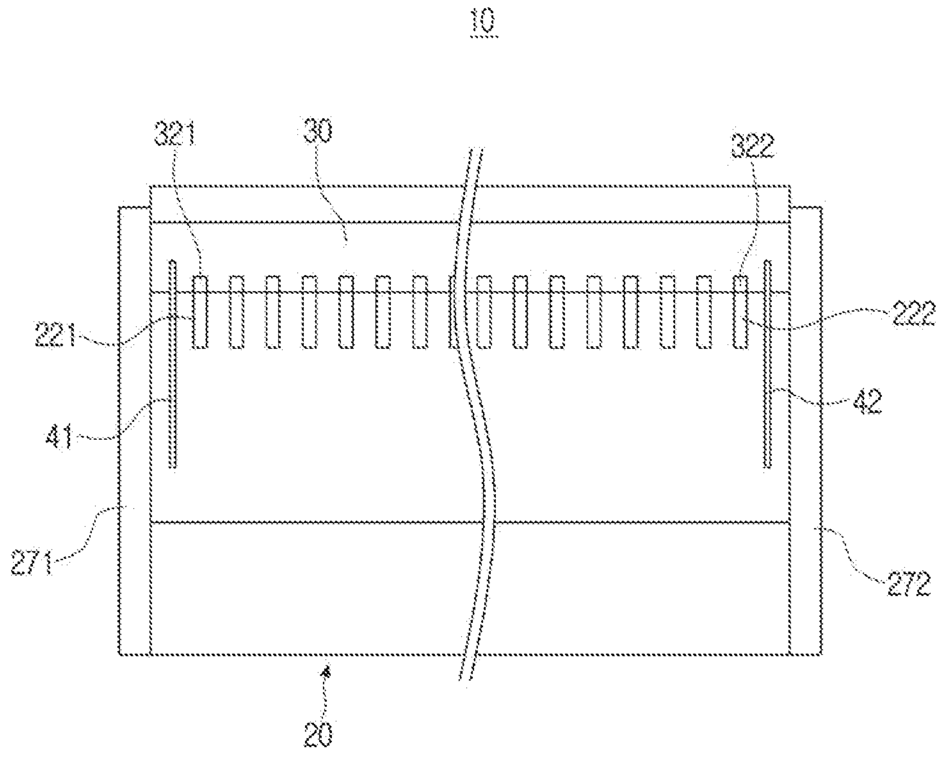
FIG. 3A is a plan view illustrating a connector according to one or more embodiments of the disclosure.
Figure 3B:
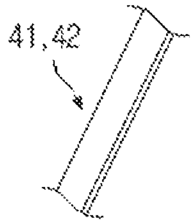
FIG. 3B is a diagram illustrating a first operating member and a second operating member of a connector have a strap shape according to one or more embodiments of the disclosure.

FIG. 1 is a perspective view illustrating a connector according to one or more embodiments of the disclosure. FIG. 2 is a side view illustrating a connector according to one or more embodiments of the disclosure. FIG. 3A is a plan view illustrating a connector according to one or more embodiments of the disclosure. FIG. 3B is a diagram illustrating a first operating member and a second operating member of a connector have a strap shape according to one or more embodiments of the disclosure.

Referring to FIG. 1, FIG. 2, and FIG. 3A, a connector 10 according to one or more embodiments of the disclosure may be mounted on a substrate 1. The connector 10 may include a base 20 on which a front end 4 of a cable 3 is seated, a locking member 30 for locking and unlocking the front end 4 of the cable 3 together with the base 20, and a first operating member 41 and a second operating member 42 for operating the locking member 30 by means of an operation in which the cable 3 is connected to the connector 10.

The cable 3 may, as an example, be a flat flexible cable (FFC). A plurality of first terminals 5 may be disposed at regular intervals along the front end 4 of the cable 3.

The base 20 may include a seating surface 23, on which the front end 4 of the cable 3 is seated, and an inclined surface 25 for guiding the front end 4 of the cable 3 to the seating surface 23.

The base 20 may have a plurality of second terminals 22 to which a plurality of first terminals 5 provided at the front end 4 of the cable 3 are electrically connected. A plurality of second terminals 22 may be disposed on the seating surface 23 of the base 20.

When the cable 3 is coupled to the connector 10, a plurality of second terminals 22 may be disposed at a position where the plurality of second terminals 22 may be electrically connected to the plurality of first terminals 5 of the cable 3. For example, the plurality of second terminals 22 may be disposed adjacent to the rear end of the locking member 30. A rear end of the locking member 30 may be a portion in which the locking member 30 is in contact with the seating surface 23 of the base 20 in an open position. An example of the open position is illustrated in FIG. 2.

The seating surface 23 of the base 20 may include a first receiving groove 211 into which the first operating member 41 is detachably inserted, and a second receiving groove 212 into which the second operating member 42 is detachably inserted. The first receiving groove 211 and the second receiving groove 212 may be disposed outside a region in which a plurality of second terminals 22 are disposed. For example, the first receiving groove 211 may be disposed adjacent to the left side of the second terminal 221 disposed at the leftmost side among the plurality of second terminals 22. The second receiving groove 212 may be disposed adjacent to the right side of the second terminal 222 disposed at the rightmost side among the plurality of second terminals 22.

The first receiving groove 211 and the second receiving groove 212 may be disposed in parallel to each other. The first receiving groove 211 and the second receiving groove 212 may be disposed in parallel with the longitudinal direction of the plurality of second terminals 22. The length of the first receiving groove 211 and the second receiving groove 212 may be formed longer than the length of the plurality of second terminals 22.

The base 20 may include a first guide wall 271 and a second guide wall 272 for guiding both sides of the cable 3 while the cable 3 is coupled to the connector 10 on both sides, respectively. In this case, the first guide wall 271 may be disposed adjacent to the first operating member 41. The second guide wall 272 may be disposed adjacent to the second operating member 42.

The first guide wall 271 may include a first guide groove 281 into which a first hinge shaft 331 of the locking member 30 is slidably inserted on a surface facing one side of the locking member 30.

The second guide wall 272 may include a second guide groove 282 into which a second hinge shaft 332 of the locking member 30 is slidably inserted on a surface facing the other side of the locking member 30.

The first guide groove 281 and the second guide groove 282 may have a linear shape having a predetermined length. The first guide groove 281 and the second guide groove 282 may be disposed in a vertical direction with respect to the seating surface 23. The first guide groove 281 and the second guide groove 282 may guide the first hinge shaft 331 and the second hinge shaft 332 of the locking member 30 to be lifted in a straight line while the locking member 30 rotates.

Figure 7:
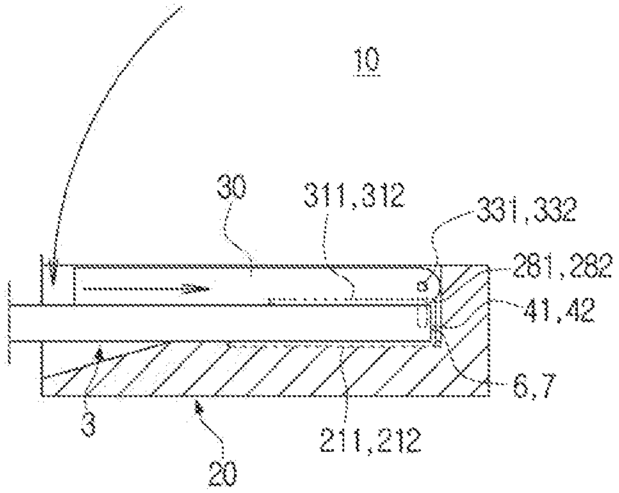
FIG. 7 is a diagram illustrating a state that a cable is connected to a connector according to one or more embodiments of the disclosure.

The locking member 30 may be connected to the base 20 to rotate from an open position, such as in FIG. 2, to a closed positon, such as in FIG. 7, or from a closed position to an open position.

The locking member 30 may be provided with a plurality of third terminals 32 to which a plurality of first terminals 5 provided at the front end portion 4 of the cable 3 are electrically connected. The plurality of third terminals 32 may be disposed at regular intervals on the inner surface 39. The inner surface 39 of the locking member 30 may face the seating surface 23 of the base 20 in the closed position, such as illustrated in FIG. 7.

A plurality of third terminals 32 may be disposed at positions that the third terminals 32 may be electrically connected to a plurality of first terminals 5 of the cable 3 when the cable 3 is coupled to the connector 10. A plurality of third terminals 32 may be electrically connected to the plurality of first terminals 5 with a plurality of second terminals 22 when the locking member 30 is in the closed position.

The locking member 30 may include a third receiving groove 311, into which the first operating member 41 is detachably inserted into an inner surface 39 thereof, and a fourth receiving groove 312 into which the second operating member 42 is detachably inserted. The third receiving groove 311 and the fourth receiving groove 312 may be disposed outside the area in which the plurality of third terminals 32 are disposed. For example, the third receiving groove 311 may be disposed to be adjacent to the left side of a third terminal 321 disposed at the leftmost side among the plurality of third terminals 32. The fourth receiving groove 312 may be disposed to be adjacent to the right side of a third terminal 322 disposed on the rightmost side among the plurality of third terminals 32.

The third receiving groove 311 and the fourth receiving groove 312 may be disposed in parallel to each other. The third receiving groove 311 and the fourth receiving groove 312 may be disposed in parallel with the longitudinal direction of the plurality of third terminals 32. The lengths of the third receiving groove 311 and the fourth receiving groove 312 may be longer than the lengths of the plurality of third terminals 32.

The third receiving groove 311 may be disposed at a position corresponding to the first receiving groove 211 of the base 20. The fourth receiving groove 312 may be disposed at a position corresponding to the second receiving groove 212 of the base 20. Accordingly, when the locking member 30 is in the closed position, the third receiving groove 311 may correspond to the first receiving groove 211 of the base 20 with the cable 3 interposed therebetween, and the fourth receiving groove 312 may correspond to the second receiving groove 212 of the base 20 with the cable 3 interposed therebetween.

The first operating member 41 and the second operating member 42 may rotate the locking member 30 to change the locking member 30 from an open position, as in FIG. 2 to a closed position, as in FIG. 7, when pressed by the front end 4 of cable 3. The locking member 30 may unlock the cable 3 in an open position and lock the cable 3 in the closed position.

The first operating member 41 may have one end 411, fixed to the base 20, and another end 412 fixed to the locking member 30. For example, one end 411 of the first operating member 41 may be bonded to the inside of the first receiving groove 211 of the base 20. The other end 412 of the first operating member 41 may be bonded to the inside of the third receiving groove 311 of the locking member 30. One end 421 of the second operating member 42 may be bonded to the inside of the second receiving groove 212 of the base 20. Another end 422 of the second operating member 42 may be bonded to the inside of the fourth receiving groove 312 of the locking member 30.

The first operating member 41 and the second operating member 42 may be in a string shape. The string shape having a width, in a direction from the first guide wall 271 to the second guide wall 272, is relatively thin. According to an embodiment, the width of the string shape of each of the first operating member 41 and the second operating member 42 may be less than a width of any of the second terminal 221 and the third terminal 322. The first operating member 41 and the second operating member 42 may be made of a flexible material. Accordingly, the first operating member 41 and the second operating member 42 may be easily bent when pressed by the front end 4 of the cable 3. The shape of the first operating member 41 and the second operating member 42 may be restored when the locking member 30 rotates from the closed position to the open position.

The first operating member 41 and the second operating member 42 may be a non-elastic, thin, and non-conductive. The first operating member 41 and the second operating member 42 may be made of a material having a strength that is at least sufficient so as to not be disconnected when pressed by the front end 4 of the cable 3.

According to one or more embodiments, the first operating member 41 and the second operating member 42 are not limited to the aforementioned shape, but may be formed in the form of a strap having a wide or thin thickness, as in FIG. 3B. The first operating member 41 and the second operating member 42 The strap shape is the shape that is wider than the string shape and may at least have a same or greater width than any of the second terminal 221 and the third terminal 322. In this case, if the thickness of the first operating member 41 and the second operating member 42 does not interfere with maintaining the closed position, the connector 10 according to one or more embodiments of the disclosure may omit the first receiving groove 211 and the second receiving groove 212 of the base 20 and the third receiving groove 311 and the fourth receiving groove 312 of the locking member 30.

The first operating member 41 and the second operating member 42 may be made of a non-conductive material having elasticity. In this case, the length of the first operating member 41 and the second operating member 42 may be formed to be shorter than when the first operating member 41 and the second operating member 42 are made of a non-elastic non-conductive material.

Hereinafter, with reference to the drawings, an example of the locking member 30 operating by the first operating member 41 and the second operating member 42 in a process where the cable 3 is connected to the connector 10 will be described.

Figure 4:
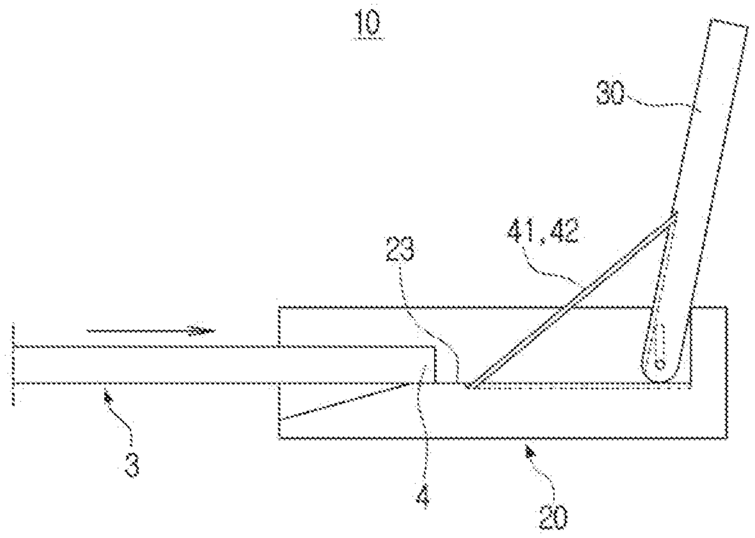
FIG. 4 is a diagram illustrating a state of before connecting a cable to a connector according to one or more embodiments of the disclosure.
Figure 5:
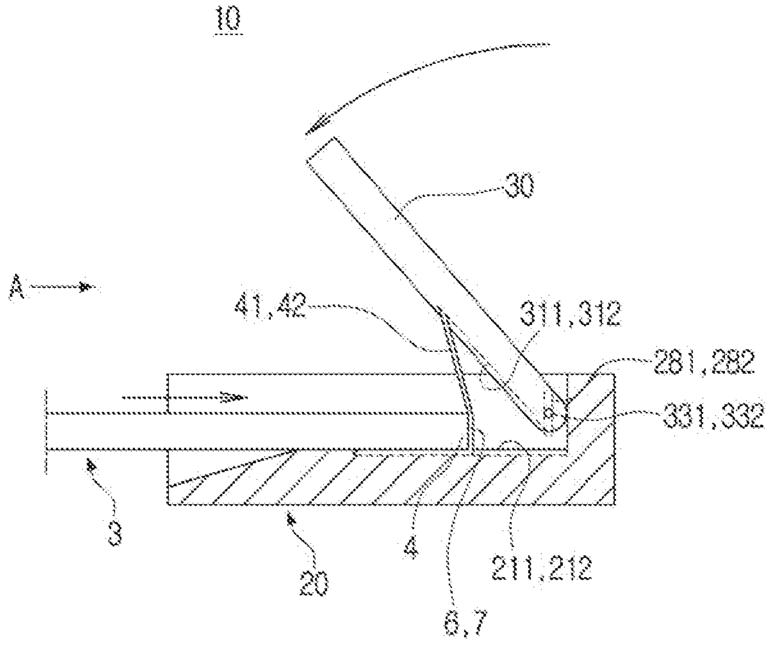
FIG. 5 is a diagram illustrating that a pair of working members of a connector are pressured by a cable and a locking member rotates from an open position to a closed position according to one or more embodiments of the disclosure.
Figure 6:
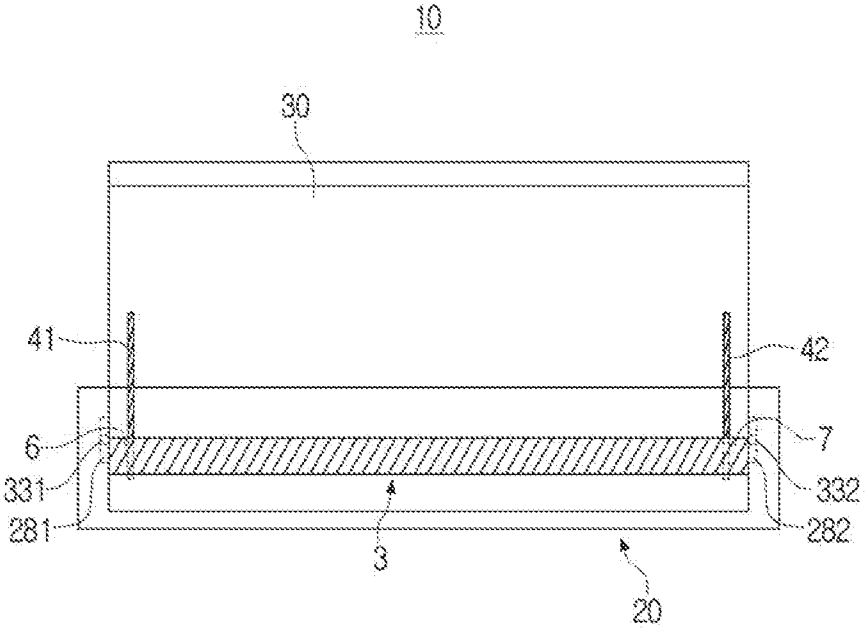
FIG. 6 is a diagram viewed from A direction of FIG. 5.

FIG. 4 is a diagram illustrating a state of before connecting a cable to a connector according to one or more embodiments of the disclosure. FIG. 5 is a diagram illustrating that a pair of working members of a connector are pressured by a cable and a locking member rotates from an open position to a closed position according to one or more embodiments of the disclosure. FIG. 6 is a diagram viewed from A direction of FIG. 5. FIG. 7 is a diagram illustrating a state that a cable is connected to a connector according to one or more embodiments of the disclosure.

Referring to FIG. 4, in order to couple the front end 4 of the cable 3 to the base 20, the front end 4 of the cable 3 is moved toward the plurality of second terminals 22 when the locking member 30 is in the open position. In this case, the front end 4 of the cable 3 may slide toward the first operating member 41 and the second operating member 42 along the seating surface 23.

Referring to FIG. 5 and FIG. 6, a left portion 6 and a right portion 7 of the front end portion 4 of a cable 3 move toward a plurality of second terminals 22 while pressing the first operating member 41 and the second operating member 42, respectively. In this case, the first operating member 41 is pressed by the left portion 6 of the front end 4 of the cable 3, and a portion close to the base 20 is bent to be accommodated in the first receiving groove 211. The second operating member 42 is pressed by a right portion 7 of the front end 4 of the cable 3, and a portion close to the base 20 is bent to be accommodated in the second receiving groove 212.

Accordingly, the locking member 30 may be pulled toward the seating surface 23 of the base 20 by the tension of the first operating member 41 and the second operating member 42. The locking member 30 may rotate counterclockwise about a first hinge shaft 331 and a second hinge shaft 332.

In this case, the first hinge shaft 331 and the second hinge shaft 332 may move upward along the first guide groove 281 and the second guide groove 282. Accordingly, a rear end of the locking member 30 may move in a direction away from the base 20 together with a counterclockwise rotation operation of the locking member 30.

Referring to FIG. 7, when the front end 4 of the cable 3 moves to a portion where the plurality of second terminals 22 are located, the first operating member 41 and the second operating member 42 may be continuously pressurized by the front end 4 of the cable 3. In this case, a part of the first operating member 41 relatively close to the locking member 30 is bent to be accommodated in the third receiving groove 311. A portion relatively close to the locking member 30 is bent and accommodated in a fourth receiving groove 312.

Accordingly, the locking member 30 may continuously rotate counterclockwise by the tension of the first operating member 41 and the second operating member 42 to rotate to the closed position. In this case, the first hinge shaft 331 and the second hinge shaft 332 may continuously move upward along the first guide groove 281 and the second guide groove 282. A rear end of the locking jaw member 30 may continue to move in a direction away from the base 20 with a counterclockwise rotation operation of the locking member 30.

The front end 4 of the cable 3 may be locked to the base 20 by the locking member 30. In this case, a plurality of first terminals 5 provided at the front end 4 of the cable 3 may be electrically connected to the second terminal 22 of the base 20 and a third terminal 32 of the locking member 30.

When the first operating member 41 and the second operating member 42 are simultaneously pressed by the front end 4 of cable 3, the locking member 30 operates from an open position to a closed position as described above. For example, when only one of the first operating member 41 and the second operating member 42 is pressed by the front end 4 of the cable 3, the locking member 30 may not smoothly rotate to the closed position. Therefore, a worker may couple the front end 4 of the cable 3 to the connector 10 in an accurate posture by the first operating member 41 and the second operating member 42. In addition, the worker may easily check whether there is a defect in coupling between the cable 3 and the connector 10.

Figure 8:
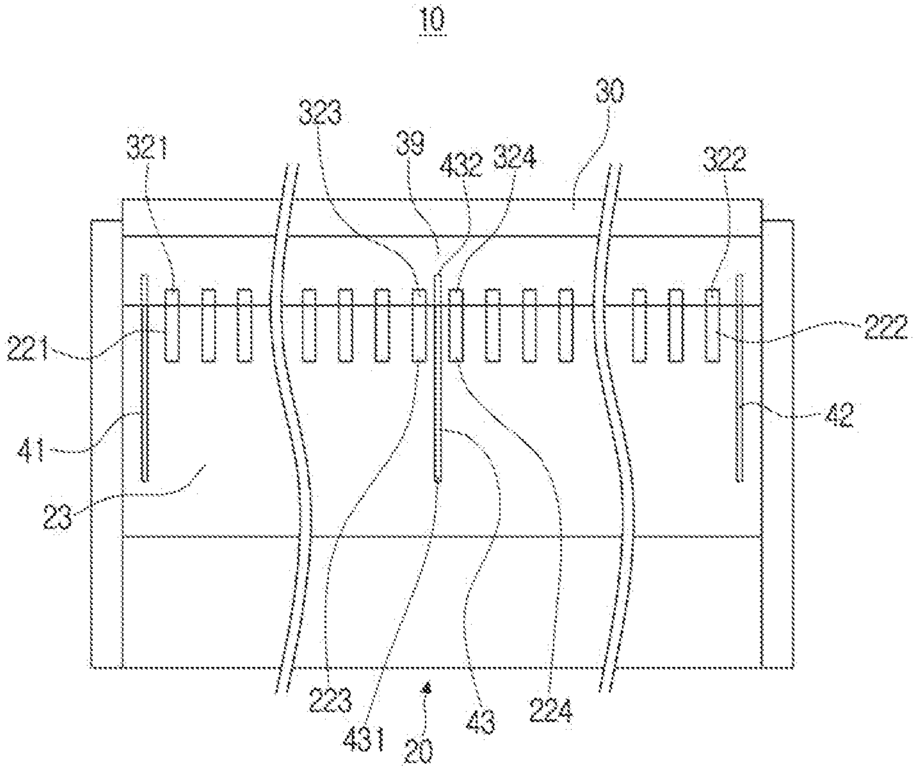
FIG. 8 is a plan view illustrating an example of adding an operating member to a connector according to one or more embodiments of the disclosure.

FIG. 8 is a plan view illustrating an example of adding an operating member to a connector according to one or more embodiments of the disclosure.

The connector 10 according to one or more embodiments may further include a third operating member 43. The third operating member 43 may have the same shape and/or material as the first operating member 41 and the second operating member 42 described above.

The third operating member 43 may be disposed between the first operating member 41 and the second operating member 42. For example, the third operating member 43 may be disposed at or about a halfway point of distance between the first operating member 41 and the second operating member 42. One end 431 of the third operating member 43 may be fixed to the base 20, and another end of the third operating member 43 may be fixed to the locking member 30.

In this case, one end 431 of the third operating member 43 may be disposed between a pair of adjacent second terminals, such as second terminal 223 and second terminal 224, in FIG. 8 so as not to interfere with the plurality of second terminals. The other end 432 of the third operating member 43 may be disposed between a pair of third terminals, such as third terminal 323 and third terminal 324, of FIG. 8 adjacent to each other so as not to interfere with the plurality of third terminals.

A fifth guide groove into which a part of the third operating member 43 is detachably inserted may be formed on the seating surface 23 of the base 20. A sixth guide groove into which the remaining portion of the third operation member 43 is detachably inserted may be formed on the inner surface 39 of the locking member 30.

The connector 10 according to one or more embodiments of the disclosure is not limited to that shown in FIG. 8, and at least one operating member other than the third operating member 43 may be further disposed between the first operating member 41 and the second operating member 42.

Figure 9:
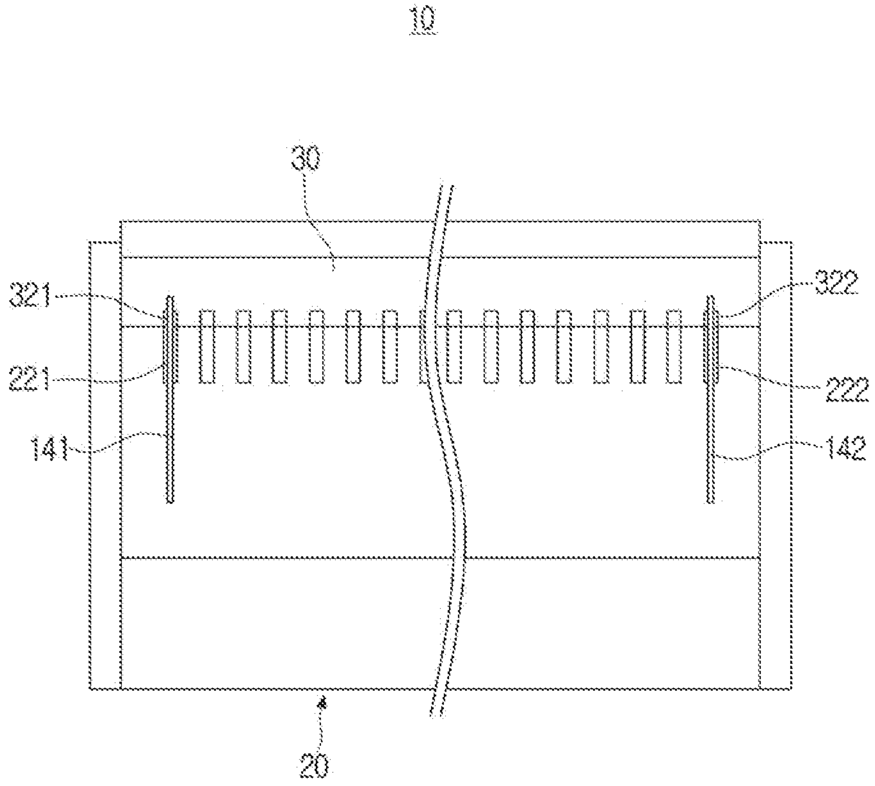
FIG. 9 is a plan view illustrating an example in which a pair of operating members of a connector according to one or more embodiments of the disclosure are conductors.
Figure 10:
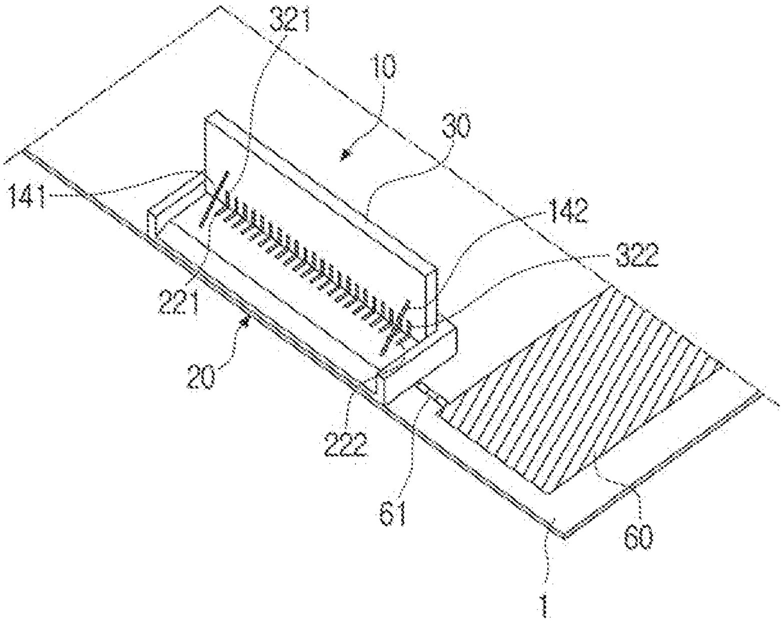
FIG. 10 is a diagram illustrating an example in which the connector shown in FIG. 9 is electrically connected to a ground layer provided on a substrate.

FIG. 9 is a plan view illustrating an example in which a pair of operating members of a connector according to one or more embodiments of the disclosure are conductors. FIG. 10 is a diagram illustrating an example in which the connector shown in FIG. 9 is electrically connected to a ground layer provided on a substrate.

Referring to FIG. 9, the connector 10 according to one or more embodiments of the disclosure may have the first operating member 141 and the second operating member 142 made of a flexible material having conductivity.

In this case, the first operating member 141 may be disposed at a position corresponding to a second terminal 221 disposed at the leftmost side among the plurality of second terminals and a third terminal 321 disposed at the leftmost side among the plurality of third terminals. The second operating member 142 may be disposed at a position corresponding to a second terminal 222 disposed on the rightmost side among the plurality of second terminals and a third terminal 322 disposed on the rightmost side among the plurality of third terminals.

Accordingly, when the locking member 30 is in the closed position, the first operating member 141 may be electrically connected to the corresponding second terminal 221 and the third terminal 321. The second operating member 142 may be electrically connected with the corresponding second terminal 222 and the third terminal 322. The first operating member 141 and the second operating member 142 may have a thickness to the extent of not hindering the locking member 30 to maintain a closed position.

Referring to FIG. 10, the first operating member 141 or the second operating member 142 may be grounded to a ground layer 60 provided on a substrate 1 through a connection wiring 61. In this case, the connector 10 may include an additional connection wiring which is electrically connected to the connection wiring 61 by the first operating member 141 or the second operating member 142 along the inner side. As described above, the connector 10 according to one or more embodiments of the disclosure may provide electrical stability with respect to a circuit mounted on the substrate 1 by expanding the ground path.

Figure 11:
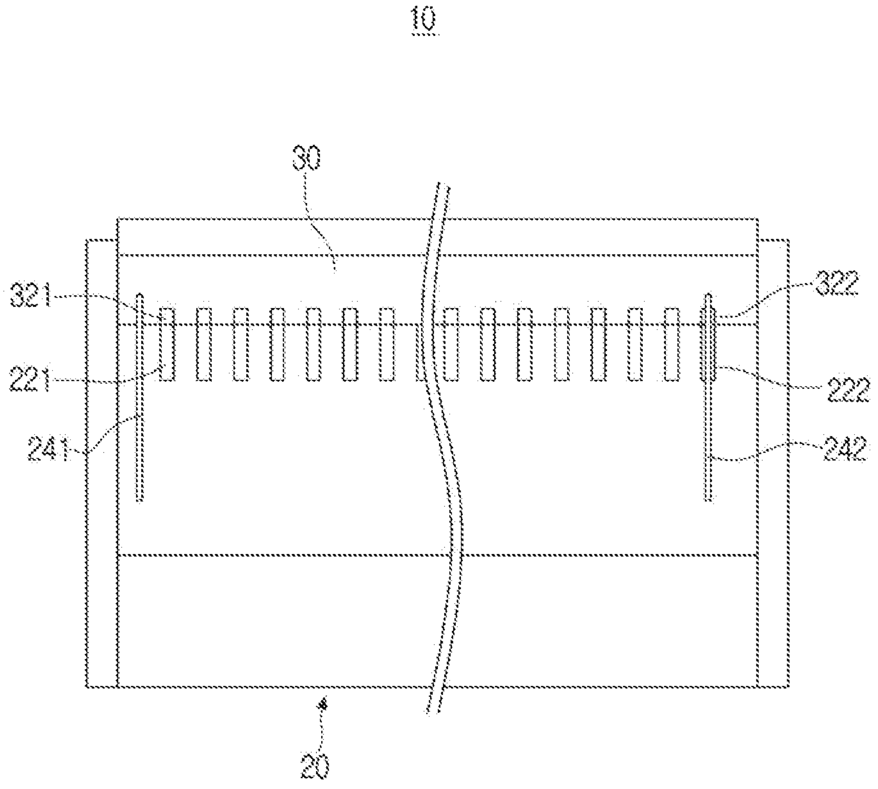
FIG. 11 is a plan view illustrating an example in which a pair of operating members of a connector according to one or more embodiments of the disclosure is a conductor and a nonconductor, respectively.

FIG. 11 is a plan view illustrating an example in which a pair of operating members of a connector according to one or more embodiments of the disclosure is a conductor and a nonconductor, respectively.

Referring to FIG. 11, the connector 10 according to one or more embodiments of the disclosure may include a first operating member 241 made of a nonconductor and a second operating member 242 made of a conductor.

In this case, the first operating member 241 may be disposed outside an area in which a plurality of second and third terminals are disposed so as not to be electrically connected to the adjacent second terminal 221 and the third terminal 321.

Conversely, the second operating member 242 may be disposed at a position for electrically connecting to the corresponding second terminal 222 and the third terminal 322. In this case, the second operating member 242 may be grounded to a ground layer 60 (see FIG. 10) provided on the substrate 1.

Figure 12:
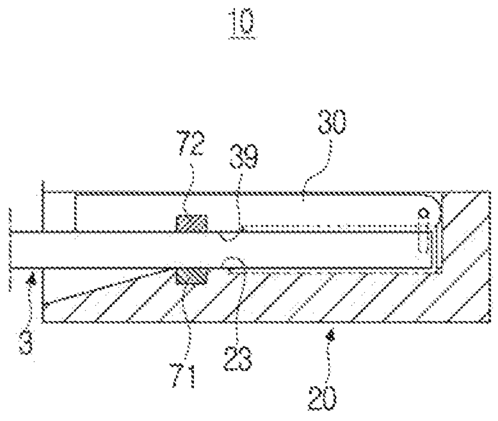
FIG. 12 is a view illustrating an example in which a magnet and a magnetic body are provided in a connector according to one or more embodiments of the disclosure.

FIG. 12 is a view illustrating an example in which a magnet and a magnetic body are provided in a connector according to one or more embodiments of the disclosure.

Referring to FIG. 12, the connector 10 according to one or more embodiments of the disclosure may further include a magnet 71 and a magnetic body 72 to prevent a locking state from being released by an external impact when the locking member 30 is in a closed position.

The magnet 71 may be disposed on the seating surface 23 of the base 20. The magnetic body 72 may be disposed on the inner surface 39 of the locking member 30. In this case, the position of the magnet 71 and the magnetic body 72 may be positioned to face each other with the cable 3 interposed therebetween at the closed position of the locking member 30.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A connector connected to a cable comprising a plurality of first terminals, the connector comprising:

a base comprising a plurality of second terminals;

a locking member comprising a plurality of third terminals and an end rotatably connected to the base;

a first operating member comprising a first end of the first operating member and a second end of the first operating member, the first end of the first operating member being fixed to the base, and the second end of the first operating member being fixed to the locking member, and a second operating member spaced apart from the first operating member and comprising a first end of the second operating member and a second end of the second operating member, the first end of the second operating member being fixed to the base, and the second end of the second operating member being fixed to the locking member, wherein the first operating member and the second operating member are configured to, based on being directly pressed on by a front end of the cable, rotate the locking member from an open position to a closed position and to lock the front end of the cable between the base and the locking member.

2. The connector of claim 1, wherein the first operating member is disposed at a first side of the base and the locking member, wherein the second operating member is disposed at a second side of the base and the locking member, and wherein the first operating member and the second operating member are further configured to, based on being pressed by the front end of the cable, pull the locking member toward the base by tension.

3. The connector of claim 2, wherein the first operating member and the second operating member comprise a flexible material.

4. The connector of claim 2, further comprising:

at least one third operating member disposed between the first operating member and the second operating member, wherein the at least one third operating member comprises a first end fixed to the base and a second end fixed to the locking member.

5. The connector of claim 4, wherein the base further comprises a first receiving groove into which a first portion of the first operating member is inserted and a second receiving groove into which a first portion of the second operating member is inserted, and wherein the locking member further comprises a third receiving groove into which a second portion of the first operating member is inserted and a fourth receiving groove into which a second portion of the second operating member is inserted.

6. The connector of claim 1, wherein the first operating member and the second operating member are further configured to, based on the locking member being in the closed position, be disposed in a position not electrically connected to the plurality of second terminals and the plurality of third terminals.

7. The connector of claim 6, wherein the first operating member and the second operating member are non-conductive.

8. The connector of claim 1, wherein the first operating member is further configured to, based on the locking member being in the closed position, be disposed in a position electrically connected to at least one of a first one of the plurality of second terminals or a first one of the plurality of third terminals, and wherein the second operating member is further configured to, based on the locking member being in the closed position, be disposed in a position electrically connected to at least one of a second one of the plurality of second terminals or a second one of the plurality of third terminals.

9. The connector of claim 8, wherein the first operating member and the second operating member are conductive.

10. The connector of claim 1, wherein the first operating member and the second operating member are configured to, based on the locking member being in the closed position, be inserted into the base and the locking member.

11. The connector of claim 1, wherein the first operating member is further configured to, based on the locking member being in the closed position, be disposed in a position not electrically connected with the plurality of second terminals and the plurality of third terminals, and wherein the second operating member is further configured to, based on the locking member being in the closed position, be disposed in a position electrically connected with one of the plurality of second terminals and one of the plurality of third terminals.

12. The connector of claim 11, wherein the first operating member is non-conductive, and wherein the second operating member is conductive.

13. The connector of claim 1, wherein the first operating member and the second operating member have a string shape.

14. The connector of claim 1, wherein the first operating member and the second operating member have a strap shape.

15. The connector of claim 1, wherein a first one of the base and the locking member comprises a magnet, and wherein a second one of the base and the locking member comprises a magnetic body configured to, when the locking member is closed, be disposed at a position corresponding to the magnet.

16. The connector of claim 1, wherein the second operating member is spaced apart from the first operating member by a distance that is less than a width of the cable.

17. The connector of claim 1, wherein the first operating member and the second operating member are elastic bands.

18. The connector of claim 1, further comprising a third operating member between the first operating member and the second operating member, the third operating member comprises a first end of the third operating member and a second end of the third operating member, the first end of the third operating member being fixed to the base, and the second end of the third operating member being fixed to the locking member, wherein the first operating member, the second operating member, and the third operating member are configured to, based on each being directly pressed on by the front end of the cable, rotate the locking member from the open position to the closed position and to lock the front end of the cable between the base and the locking member.

19. A connector connected to a cable comprising a plurality of first terminals, the connector comprising:

a base comprising a plurality of second terminals;

a locking member comprising a plurality of third terminals and an end rotatably connected to the base;

a first operating member comprising a first end of the first operating member and a second end of the first operating member, the first end of the first operating member being fixed to the base, and the second end of the first operating member being fixed to the locking member, and a second operating member spaced apart from the first operating member and comprising a first end of the second operating member and a second end of the second operating member, the first end of the second operating member being fixed to the base and the second end of the second operating member being fixed to the locking member, wherein the first operating member and the second operating member are configured to, based on being pressed by a front end of the cable, rotate the locking member from an open position to a closed position and to lock the front end of the cable between the base and the locking member, wherein the first operating member is further configured to, based on the locking member being in the closed position, be disposed in a position electrically connected to at least one of a first one of the plurality of second terminals or a first one of the plurality of third terminals, and wherein the second operating member is further configured to, based on the locking member being in the closed position, be disposed in a position electrically connected to at least one of a second one of the plurality of second terminals or a second one of the plurality of third terminals.

20. A connector connected to a cable comprising a plurality of first terminals, the connector comprising:

a base comprising a plurality of second terminals;

a locking member comprising a plurality of third terminals and an end rotatably connected to the base;

a first operating member comprising a first end of the first operating member and a second end of the first operating member, the first end of the first operating member being fixed to the base, and the second end of the first operating member being fixed to the locking member, and a second operating member spaced apart from the first operating member and comprising a first end of the second operating member and a second end of the second operating member, the first end of the second operating member being fixed to the base and the second end of the second operating member being fixed to the locking member, wherein the first operating member and the second operating member are configured to, based on being pressed by a front end of the cable, rotate the locking member from an open position to a closed position and to lock the front end of the cable between the base and the locking member, wherein the first operating member is disposed at a first side of the base and the locking member, wherein the second operating member is disposed at a second side of the base and the locking member, and wherein:

(i) the first operating member and the second operating member are further configured to, based on being pressed by the front end of the cable, pull the locking member toward the base by tension, or (ii) the first operating member is further configured to, based on the locking member being in the closed position, be disposed in a position not electrically connected with the plurality of second terminals and the plurality of third terminals, and the second operating member is further configured to, based on the locking member being in the closed position, be disposed in a position electrically connected with one of the plurality of second terminals and one of the plurality of third terminals.

* * * * *